United States Patent
Mei et al.

(10) Patent No.: US 12,144,453 B2
(45) Date of Patent: *Nov. 19, 2024

(54) COOKING APPLIANCE

(71) Applicant: FOSHAN SHUNDE MIDEA ELECTRICAL HEATING APPLIANCES MANUFACTURING CO., LTD, Foshan (CN)

(72) Inventors: Ruoyu Mei, Foshan (CN); Rongkang Mo, Foshan (CN); Ya Zhou, Foshan (CN); Wanbao Gao, Foshan (CN)

(73) Assignee: FOSHAN SHUNDE MIDEA ELECTRICAL HEATING APPLIANCES MANUFACTURING CO., LTD, Foshan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/098,116

(22) Filed: Jan. 18, 2023

(65) Prior Publication Data

US 2023/0180959 A1    Jun. 15, 2023

Related U.S. Application Data

(63) Continuation of application No. 16/625,499, filed as application No. PCT/CN2017/113181 on Nov. 27, 2017, now Pat. No. 11,583,128.

(30) Foreign Application Priority Data

Jun. 21, 2017 (CN) .......................... 201720731300.6
Jun. 21, 2017 (CN) .......................... 201720735533.3

(51) Int. Cl.
*A47J 27/08*   (2006.01)
*A47J 27/09*   (2006.01)

(52) U.S. Cl.
CPC ....... *A47J 27/0804* (2013.01); *A47J 27/0813* (2013.01); *A47J 27/09* (2013.01)

(58) Field of Classification Search
CPC ................ A47J 27/0804; A47J 27/0806; A47J 27/0808; A47J 27/0811; A47J 27/0813; A47J 27/0815; A47J 27/09; A47J 27/902
(Continued)

(56) References Cited

U.S. PATENT DOCUMENTS 6,105,810 A    8/2000  Daenen et al.
9,456,713 B2  10/2016  Backaert et al.
(Continued)

FOREIGN PATENT DOCUMENTS

CN    202567840 U   12/2012
CN    104172906 A   12/2014
(Continued)

OTHER PUBLICATIONS

World Intellectual Property Organization (WIPO) International Search Report for PCT/CN2017/113181 Mar. 20, 2018 8 Pages (including translation).
(Continued)

*Primary Examiner* — Reginald Alexander
(74) *Attorney, Agent, or Firm* — Anova Law Group, PLLC

(57) ABSTRACT

A cooking appliance includes a pot lid, a pot body, and a pot lid. The pot lid has an oval cross section with a long axis and a short axis orthogonal to each other. The pot body includes a limiting boss provided at an upper surface of the pot body. The limiting boss is configured to abut against an outer peripheral edge of the pot lid when the pot lid is closed. The pot lid locking assembly is configured to lock the pot lid in a closed state. The pot lid locking assembly includes at least
(Continued)

one of a lid locking part disposed at the pot lid or a pot locking part disposed at the pot body.

20 Claims, 14 Drawing Sheets

(58) Field of Classification Search
USPC .......................................... 99/337; 219/440
See application file for complete search history.

(56) References Cited

U.S. PATENT DOCUMENTS

| | | | |
|---|---|---|---|
| 2011/0031734 A1 | 2/2011 | Bailey et al. | |
| 2013/0098921 A1* | 4/2013 | Yang ...................... | B65D 25/28 |
| | | | 220/573.1 |
| 2014/0103050 A1* | 4/2014 | Li ............................ | A47J 36/10 |
| | | | 220/326 |
| 2017/0290452 A1* | 10/2017 | Guillaume ................ | A23L 5/17 |
| 2018/0153329 A1* | 6/2018 | Glucksman ............ | A47J 27/004 |

FOREIGN PATENT DOCUMENTS

| | | |
|---|---|---|
| CN | 204260546 U | 4/2015 |
| CN | 106235878 A | 12/2016 |
| CN | 205885253 U | 1/2017 |
| DE | 9408536.6 A1 | 10/1994 |
| EP | 3100657 A1 | 12/2016 |
| FR | 3059534 A1 | 6/2018 |
| JP | 2007283060 A | 11/2007 |

OTHER PUBLICATIONS

World Intellectual Property Organization (WIPO) Written Opinion for PCT/CN2017/113181 Mar. 20, 2018 6 Pages (including translation).

* cited by examiner

COOKING APPLIANCE

CROSS-REFERENCE TO RELATED APPLICATIONS

This application is a continuation of application Ser. No. 16/625,499, filed Dec. 20, 2019, which is a National Stage Entry under 35 U.S.C. § 371 of International Application No. PCT/CN2017/113181, filed Nov. 27, 2017, which claims priority to Chinese Application Nos. 201720731300.6 and 201720735533.3, both filed Jun. 21, 2017, the entire contents of all of which are incorporated herein by reference.

FIELD

The present disclosure relates to a field of cooking appliance manufacturing technology, and more particularly, to a cooking appliance.

BACKGROUND

In the related art, a pot lid of a cooking appliance, such as an oval pressure cooker, has a long axis and a short axis. During operation of a user, it is difficult to properly close the pot lid on the first try, and during use, the user needs to adjust the position of the pot lid multiple times before placing the pot lid on the pot body accurately.

SUMMARY

The present disclosure aims to at least solve one of the technical problems in the related art. Accordingly, the present disclosure proposes a cooking appliance has the advantages of convenient lid closure, simple operation, and the like.

In order to achieve the objective, embodiments of the present disclosure provides a cooking appliance. The cooking appliance includes: a pot lid having a cross section with a long axis and a short axis orthogonal to each other; a pot body having an upper surface provided with a limiting boss, the limiting boss configured to abut against an outer peripheral edge of the pot lid when the pot lid is closed; and a pot lid locking assembly configured to lock the pot lid in a closed state, and disposed on at least one of the pot lid or the pot body.

The cooking appliance according to the embodiments of the present disclosure has the advantages of convenient lid closure, simple operation, and the like.

In addition, the cooking appliance according to the above embodiments of the present disclosure can have the additional technical features as follows.

According to an embodiment of the present disclosure, an inner side surface of the limiting boss is inclined upward from the inside to the outside. In this way, the inner side surface can guide the pot lid.

Optionally, the height of the limiting boss from the upper surface of the pot body in a vertical direction is 1-25 mm. In this way, the position of the pot lid can be limited accurately when the pot lid is fastened.

According to an embodiment of the present disclosure, the pot body is provided with two handles opposite to each other in a circumferential direction of the pot body, and a plurality of the limiting bosses are provided and disposed on the two handles. Thus, the plurality of the limiting bosses can be used to orient the pot lid.

Further, each handle is provided with two limiting bosses spaced apart from each other along the circumferential direction of the pot body. Thus, it is possible to prevent the pot lid from tilting when closed.

Further, an upper surface of each handle is provided with a limiting groove located between the two limiting bosses. Thus, the limiting groove can automatically position the center of the pot lid and the center the pot body.

Optionally, the pot lid locking assembly includes: a guide rail provided at the pot lid; and two snaps provided oppositely in a circumferential direction of the pot lid, and disposed on the guide rail and capable of getting close to each other or away from each other, wherein each handle is located between the two snaps in the circumferential direction of the pot body when the pot lid is closed. Thus, the limiting boss can limit the position of the pot lid reliably.

Further, the guide rail is oriented along a direction of the short axis, and when the pot lid is closed, the two handles are disposed adjacent to both ends of the long axis respectively. Thus, the structure strength of the pot lid locking assembly can be enhanced.

According to another embodiment of the present disclosure, the pot body includes: an outer housing, the limiting boss being disposed on an upper surface of the outer housing; an outer pot provided in the outer housing; and an inner pot provided in the outer pot. Thus, the cooking appliance can realize a cooking function conveniently.

Further, the pot lid and the inner pot each have an oval cross section, which can reduce the influence of the deformation of the pot lid on the fastening effect of the pot lid.

According to an embodiment of the present disclosure, a positioning boss is provided at a lower surface of the pot lid, a positioning groove is provided at the upper surface of the pot body, and the positioning boss is fitted in the positioning groove when the pot lid is closed, which makes it convenient for the user to operate.

According to an embodiment of the present disclosure, the positioning boss has a cross-sectional area increased gradually from bottom to top. Thus, the fastening of the pot lid can be guided conveniently by using the positioning boss.

Further, the positioning groove is configured as an arc groove, a V-shaped groove, or a conical groove, and a shape of the positioning boss matches a shape of the positioning groove. Thus, the closure of the pot lid can be positioned and oriented by using the positioning boss and the positioning groove.

Optionally, the pot lid includes a pot lid cover plate and a pot lid enclosure plate connected to the pot lid cover plate and extending in a circumferential direction of the pot lid cover plate, and the positioning boss is disposed on a lower edge of the pot lid enclosure plate. Thus, the positioning boss can be arranged conveniently.

According to another embodiment of the present disclosure, two positioning bosses are provided and arranged oppositely in a circumferential direction of the pot lid. Thus, the pot body and the pot lid can be stressed uniformly.

Further, each positioning boss is provided with a notch at a lower end of the positioning boss, and two ends of each notch form two fulcrums on the positioning boss, wherein four fulcrums are on the same plane. Thus, the placement of the pot lid is facilitated.

Further, a distance H between two fulcrums on each positioning boss is greater than 30 mm, which can enhance the stability of the pot lid placed on a plane.

Optionally, the pot lid locking assembly includes: a guide rail provided at the pot lid; and two snaps provided oppositely in the circumferential direction of the pot lid, and disposed on the guide rail and capable of getting close to each other or away from each other, wherein each positioning boss is located between the two snaps in the circumferential direction of the pot lid when the pot lid is closed. Thus, the pot lid can be positioned and oriented reliably by using the positioning boss.

Further, the guide rail is oriented along a direction of the short axis, and when the pot lid is closed, the two positioning bosses are located at both ends of the long axis respectively. Thus, the structural strength of the pot lid locking assembly can be enhanced.

Additional aspects and advantages of the present disclosure will be given in part in the following descriptions, become apparent in part from the following descriptions, or be learned from the practice of the present disclosure.

BRIEF DESCRIPTION OF THE DRAWINGS

These and/or other aspects and advantages of the present disclosure will become apparent and more readily appreciated from the following descriptions about embodiments with reference to the drawings, in which.

Figure 1:
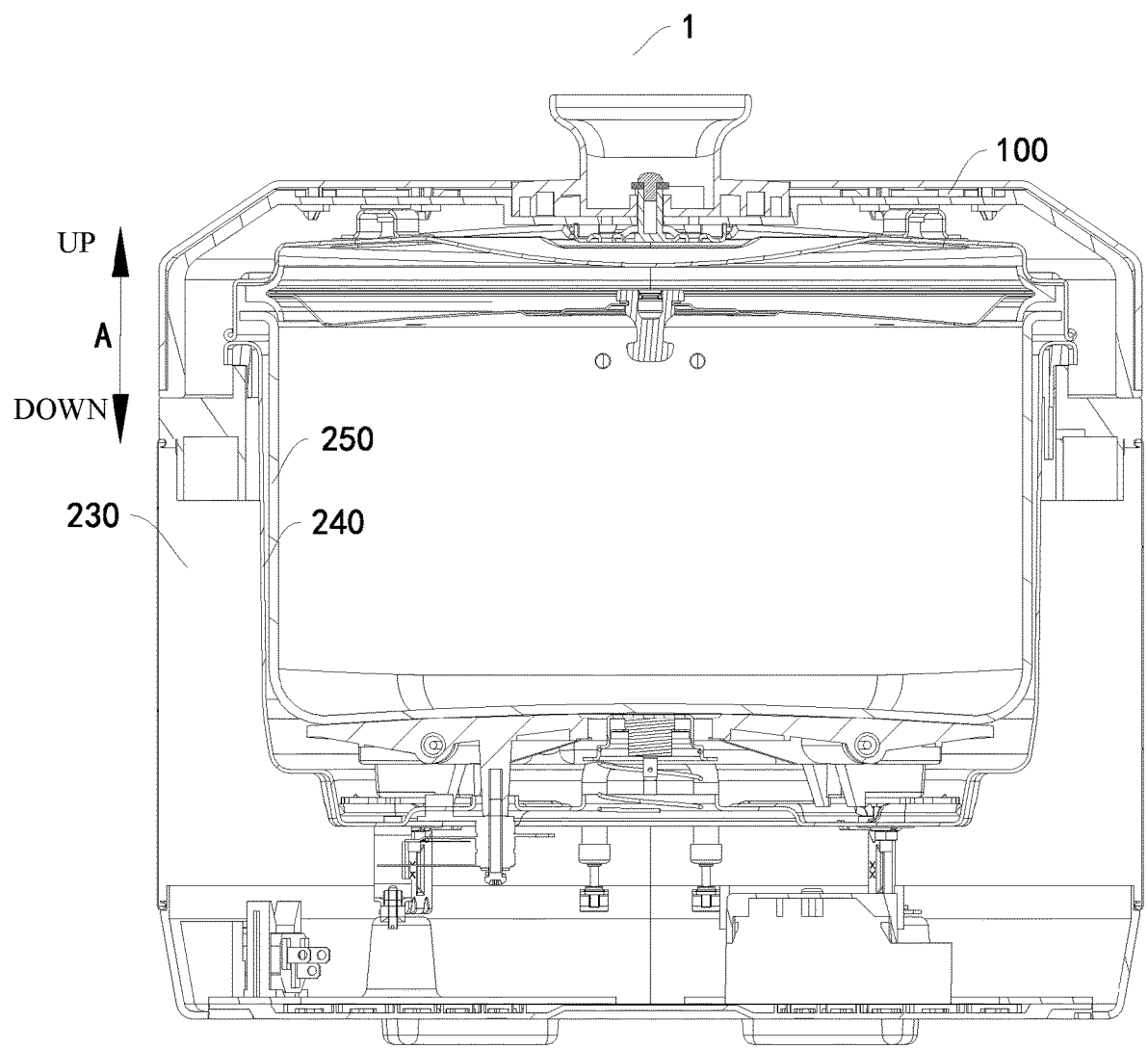
FIG. 1 illustrates a sectional view of a cooking appliance according to an embodiment of the present disclosure.
Figure 2:
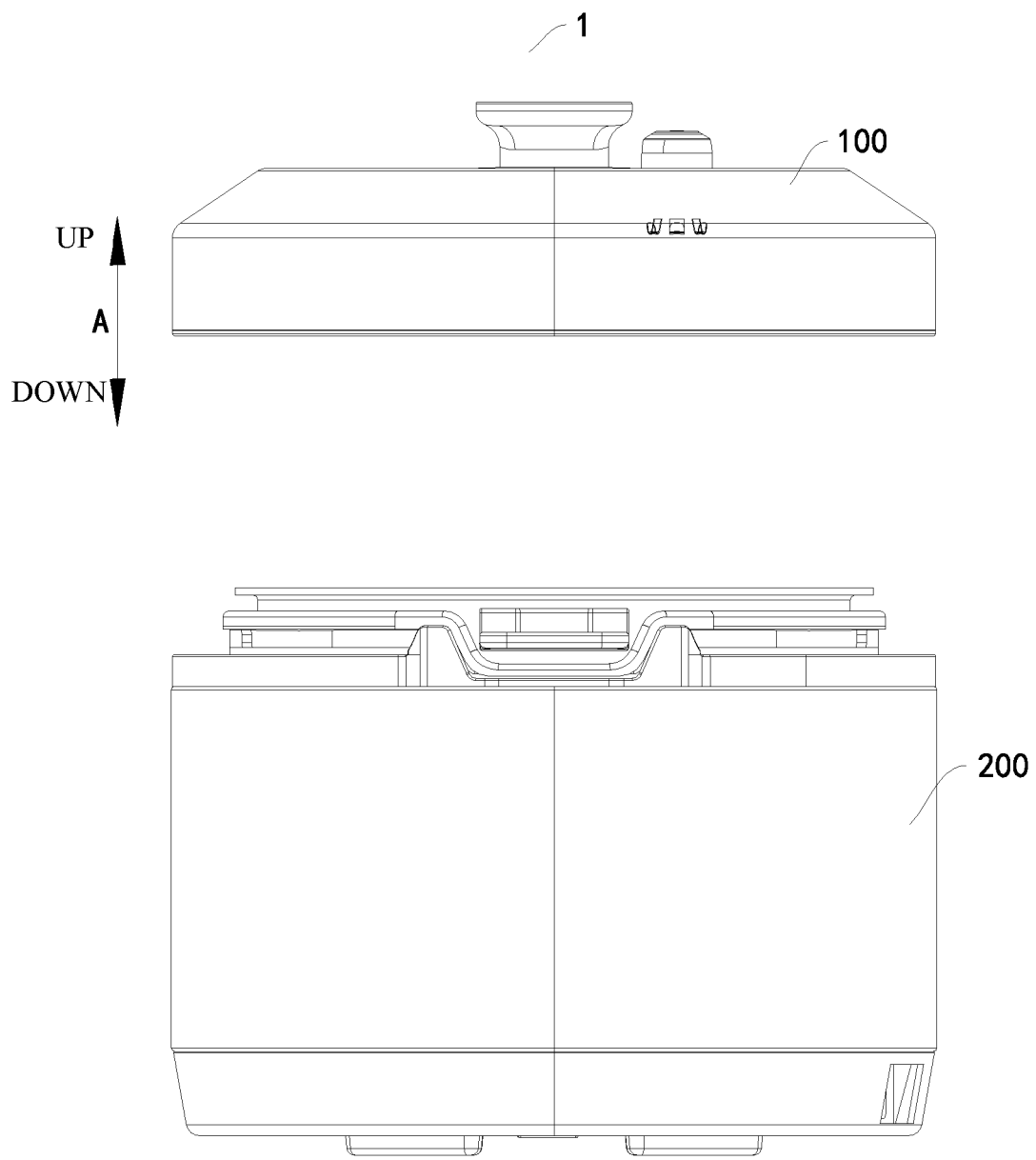
FIG. 2 illustrates an exploded view of a cooking appliance according to an embodiment of the present disclosure.
Figure 3:
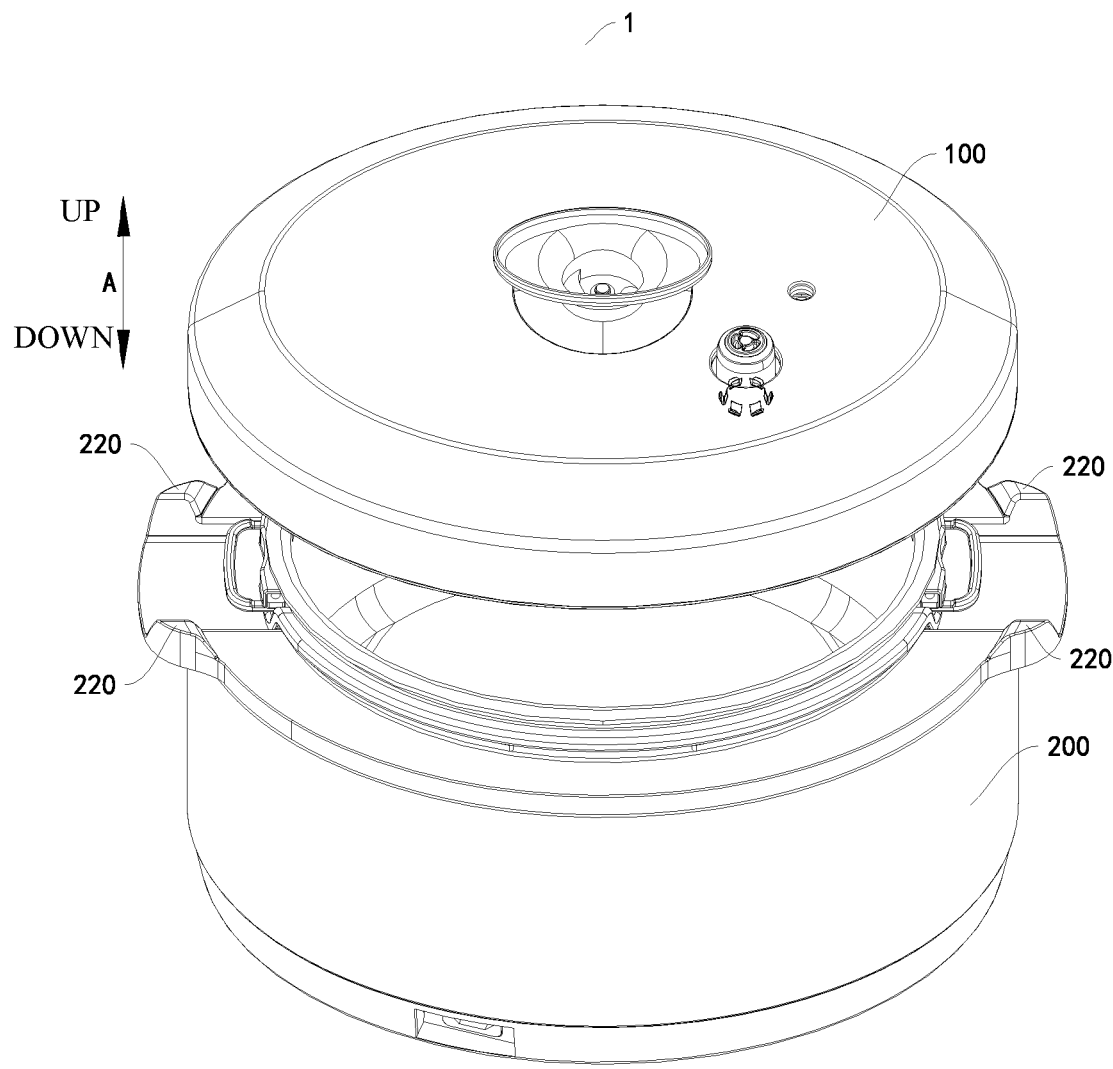
FIG. 3 illustrates an exploded view of a cooking appliance according to an embodiment of the present disclosure.

Reference numerals: cooking appliance 1, pot lid 100, positioning boss 110, notch 111, pot lid cover plate 120, pot lid enclosure plate 130, pot body 200, positioning groove 210, limiting boss 220, inner side surface 211, handle 212, outer housing 230, outer pot 240, inner pot 250, height G of positioning boos from upper surface of pot body in the vertical direction, distance H between two fulcrums, pot lid locking assembly 300, guide rail 310, and snap 320.

DETAILED DESCRIPTION

Embodiments of the present disclosure will be described in detail below, and examples of the embodiments will be shown in the drawings, wherein the same or similar elements and the elements having same or similar functions are denoted by like reference numerals throughout the descriptions. The embodiments described herein with reference to the drawings are exemplary and used to generally understand the present disclosure. The embodiments shall not be construed to limit the present disclosure.

A cooking appliance 1 according to embodiments of the present disclosure will be described with reference to the drawings.

As shown in FIGS. 1 to 14, the cooking appliance 1 according to the embodiments of the present disclosure includes a pot lid 100, a pot body 200, and a pot lid locking assembly 300.

The cross section of the pot lid 100 has a long axis and a short axis orthogonal to each other. An upper surface of the pot body 200 is provided with a limiting boss 220 (an up-down direction indicated by arrow A in FIGS. 1-6 and FIGS. 8-13). The limiting boss 220 abuts against an outer peripheral edge of the pot lid 100 when the pot lid 100 is closed. The pot lid locking assembly is used to lock the pot lid 100 in a closed state, and the pot lid locking assembly is disposed on at least one of the pot lid 100 or the pot body 200.

For the cooking appliance 1 according to the embodiments of the present disclosure, by making the cross section of the pot lid 100 having the long axis and the short axis orthogonal to each other, the pot lid 100 can be substantially configured to be oval. Compared with round pot lids in the related art, the cooking appliance with the oval pot lid can cook large rectangular food materials, the application range of the cooking appliance is expanded, and the operational comfort is improved.

Moreover, since the upper surface of the pot body 200 is provided with the limiting boss 220, and the limiting boss 220 abuts against the outer peripheral edge of the pot lid 100 when the pot lid 100 is closed, the limiting boss 220 can be used to limit and orient the pot lid 100 when the pot lid 100 is closed, which can not only ensure that the pot lid 100 is accurately fastened onto the pot body 200 when it is closed, but also avoid detachment of the pot lid 100 and the pot body 200 due to improper fastening. In this way, the working reliability of the cooking appliance 1 can be enhanced to improve the cooking effect of the cooking appliance 1, and the pot lid 100 can be accurately closed on the first try during operation, which avoids repeated adjustment of the pot lid 100 when the user closes the pot lid 100, thereby realizing the smooth closure of the pot lid 100, simplifying the operation process, facilitating the user's operation, and improving the operational comfort, compared with the cooking appliances in the related art.

In addition, by providing the pot lid locking assembly installed on at least one of the pot lid 100 or the pot body 200, the pot lid 100 can be locked in the closed state, so that not only the cooking effect of the cooking appliance 1 can be guaranteed during cooking, but also the reliable locking of the pot lid 100 in the closed state can be ensured, thereby enabling the cooking appliance 1 to work reliably.

Therefore, the cooking appliance 1 according to the embodiments of the present disclosure has the advantages of convenient closure of the pot lid, simple operation, and the like.

The cooking appliance 1 according to specific embodiments of the present disclosure will be described below with reference to the drawings.

In some specific embodiments of the present disclosure, as shown in FIGS. 1-13, the cooking appliance 1 according to the embodiments of the present disclosure includes the pot lid 100, the pot body 200, and the pot lid locking assembly.

Figure 7:
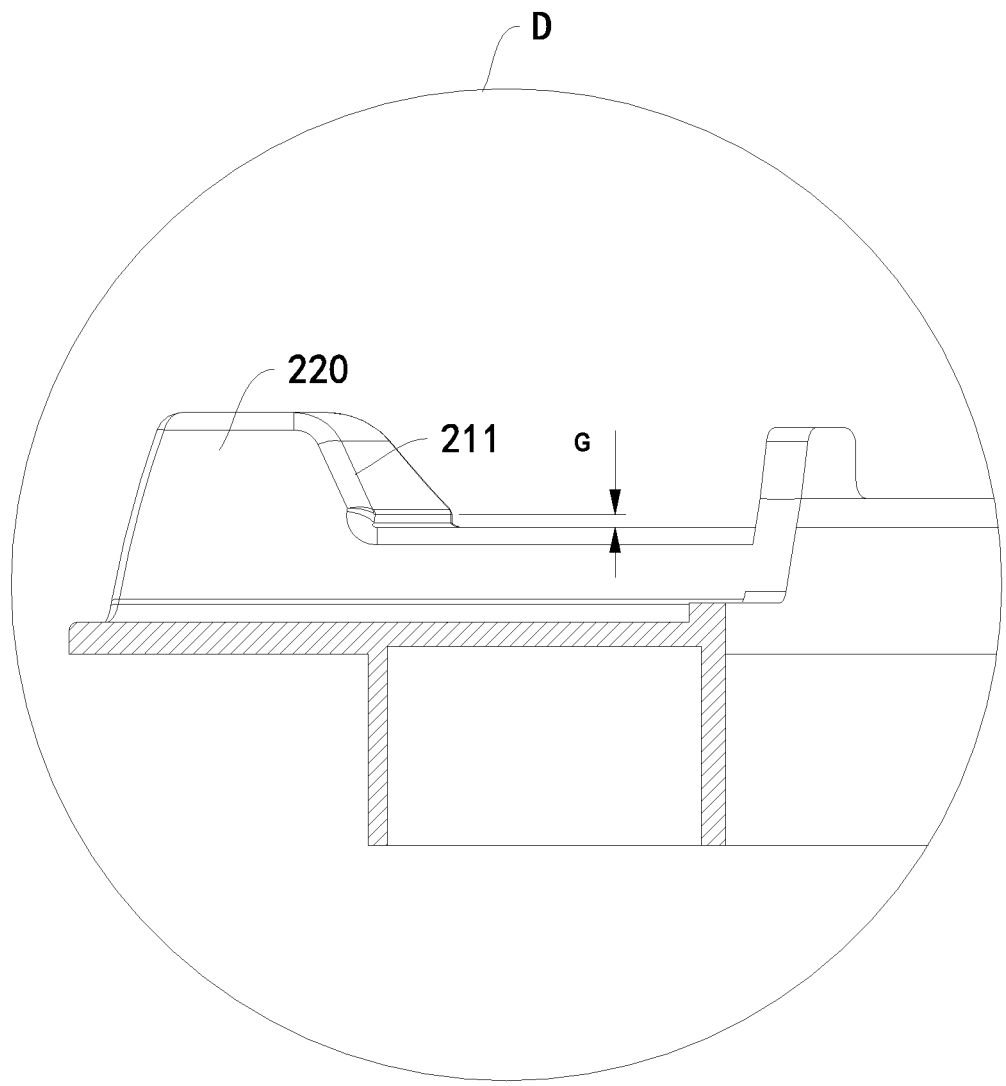
FIG. 7 illustrates an enlarged view of part D in FIG. 6.

Specifically, as shown in FIG. 7, an inner side surface 211 of the limiting boss 220 is inclined upward from the inside to the outside. In this way, when the pot lid 100 is closed, the inner side surface 211 can guide the pot lid 100 to facilitate the smooth closure of the pot lid 100.

Optionally, the height G of the limiting boss 220 from the upper surface of the pot body 200 in the vertical direction is 1-25 mm. In this way, it is convenient to realize the accurate position limiting when the pot lid 100 is fastened, so as to improve the reliability of the fastening of the pot lid 100.

Figure 4:
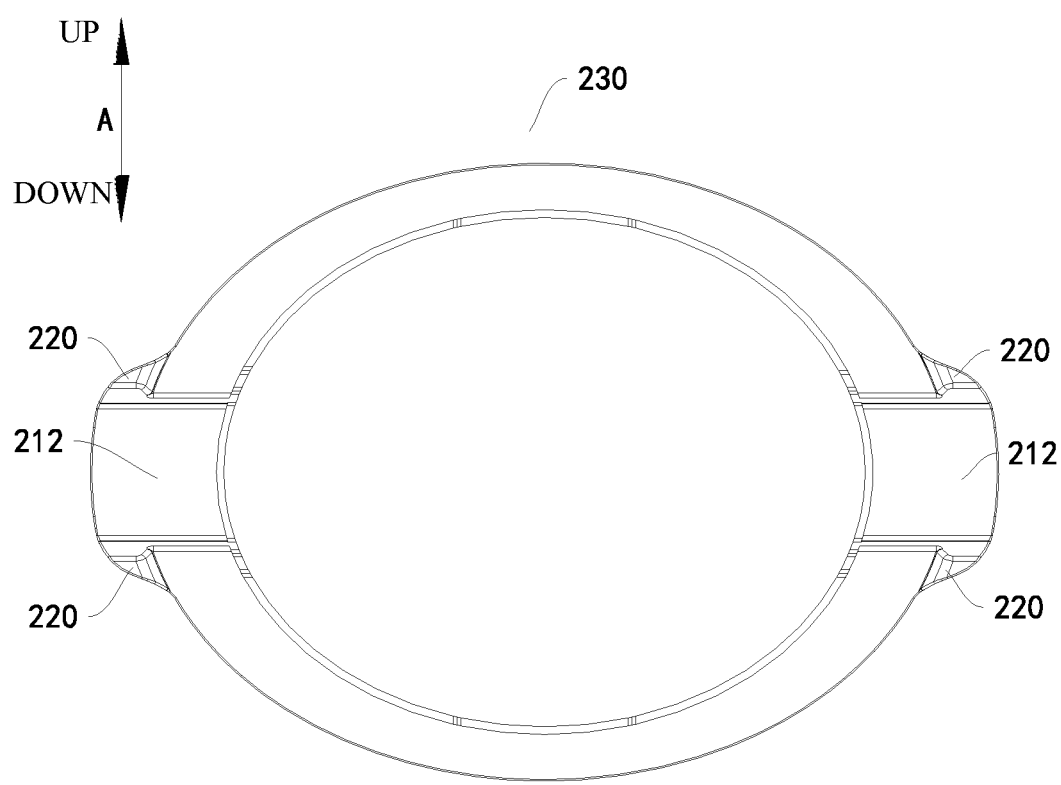
FIG. 4 illustrates a schematic structural view of an outer housing according to an embodiment of the present disclosure.
Figure 5:
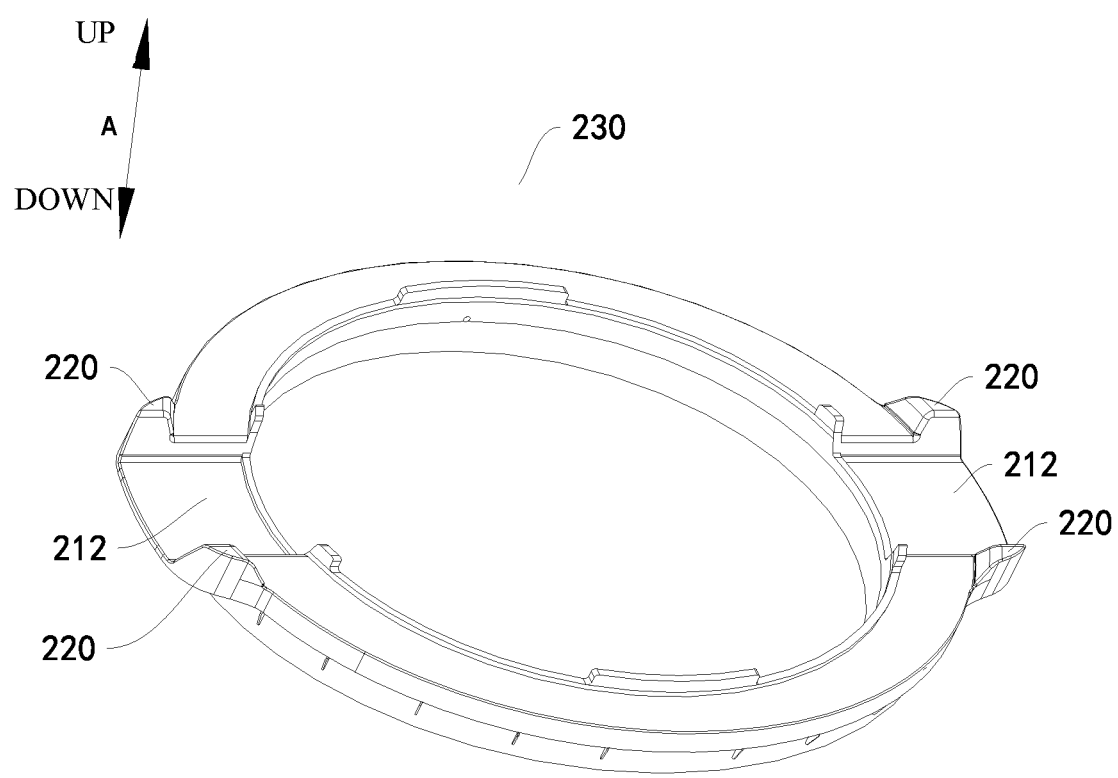
FIG. 5 illustrates a schematic structural view of an outer housing according to an embodiment of the present disclosure.
Figure 6:
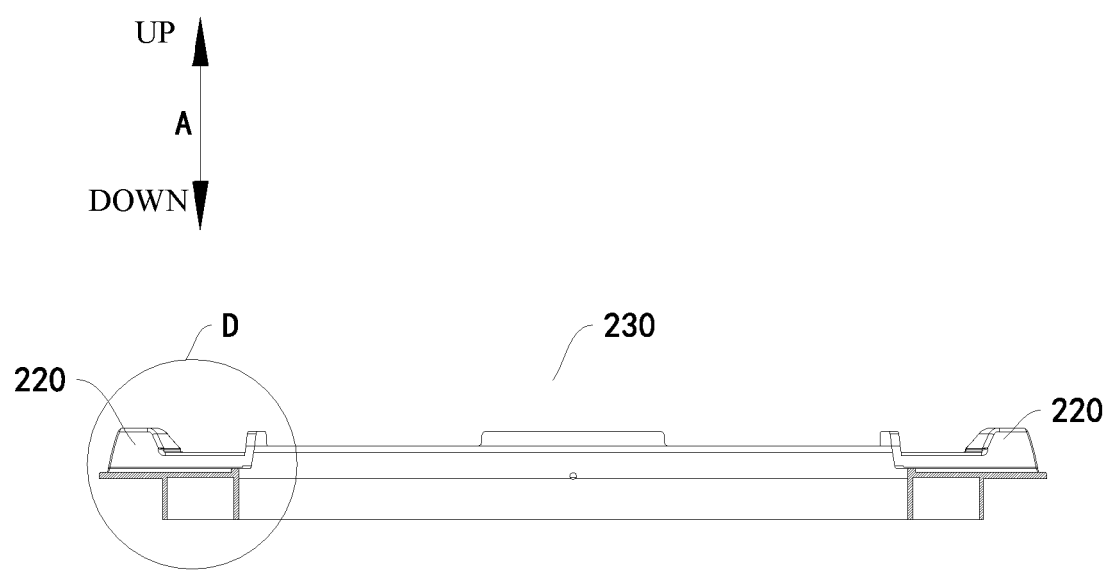
FIG. 6 illustrates a schematic structural view of an outer housing according to an embodiment of the present disclosure.

Specifically, as shown in FIG. 4 and FIG. 5, the pot body 200 is provided with two handles 212 opposite to each other in a circumferential direction of the pot body 200, and a plurality of limiting bosses 220 are provided and distributed on the two handles 212, such that the pot lid 100 can be oriented by means of the plurality of limiting bosses 220, and hence the user can close the pot lid 100 conveniently from different directions, facilitating the closure of the pot lid 100 on the first try.

More specifically, as shown in FIGS. 4 and 5, each handle 212 is provided with two limiting bosses 220 spaced apart from each other along the circumferential direction of the pot body 200. In this way, the two limiting bosses 220 on each handle 212 can be used to position and guide the closure of the pot lid 100, so that the pot lid 100 is stressed more uniformly, avoiding the tilt of the pot lid 100 during the closure, and closing the pot lid 100 more smoothly.

Further, an upper surface of each handle 212 is provided with a limiting groove located between the two limiting bosses 220. In this way, the limiting groove can enable an axis of the pot lid 100 and an axis of the pot body 200 to be positioned automatically, which further facilitates the smooth fastening of the pot lid 100.

Figure 14:
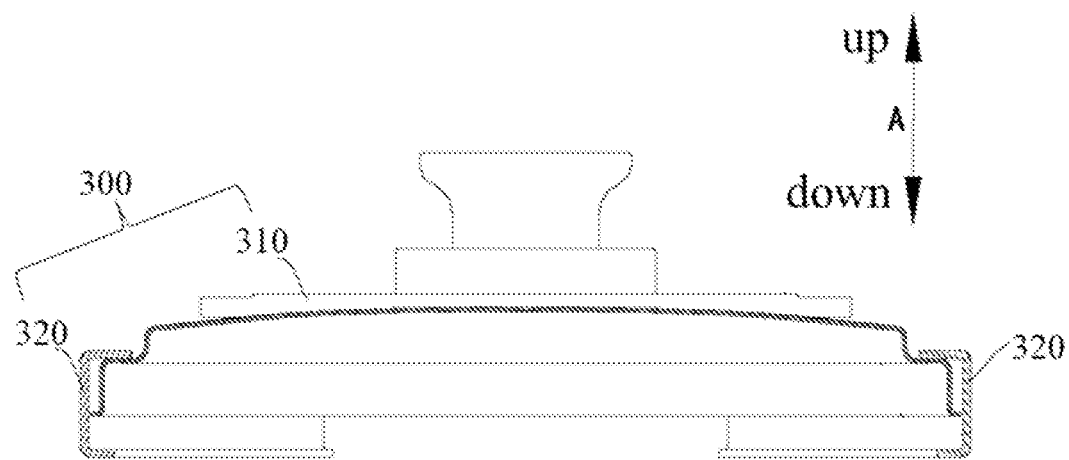
FIG. 14 illustrates a schematic structural diagram showing a pot lid locking assembly according to an embodiment of the present disclosure.

Optionally, as shown in FIG. 14, the pot lid locking assembly 300 includes a guide rail 310 and snaps 320, and the guide rail 310 is provided at the pot lid 100. The two snaps 320 are oppositely arranged in the circumferential direction of the pot lid 100. The two snaps 320 can be arranged on the guide rail 310 close to each other or away from each other. When the pot lid 100 is closed, each handle 212 is located between the two snaps 320 in the circumferential direction of the pot body 200. In this way, the limiting boss 220 is arranged between the two snaps 320 in the circumferential direction of the pot body 200, and when the pot lid 100 is closed, the limiting boss 220 can limit and orient the pot lid 100 reliably, which facilitates the fastening of the pot lid 100 and improves the accuracy of the fastening of the pot lid 100, compared with the related art where snaps 320 are used for limitation and orientation but the snaps 320 cannot effectively limit the pot lid in the movement direction of the snaps 320.

Further, the guide rail is oriented along a direction of the short axis, and when the pot lid 100 is closed, the two handles 212 are disposed adjacent to both ends of the long axis respectively. In this way, it is convenient to improve the structural strength of the pot lid locking assembly and the stability of the pot lid locking assembly, and moreover, since deformation is less likely to occur in the direction of the short axis of the pot lid 100 than in a direction of the long axis, it is possible to prevent the deformation of the pot lid 100 from affecting the sliding of the snaps.

FIGS. 1 to 13 show the cooking appliance 1 according to the present disclosure. As shown in FIG. 1, the pot body 200 includes an outer housing 230, an outer pot 240 and an inner pot 250, and the limiting boss 220 is disposed on an upper surface of the outer housing 230. The outer pot 240 is disposed in the outer housing 230. The inner pot 250 is disposed in the outer pot 240. The cooking function of the cooking appliance 1 can be realized conveniently and the working performance of the cooking appliance 1 can be improved.

Specifically, the pot lid 100 and the inner pot 250 each have an oval cross section. Due to the relatively low overall rigidity of the oval pot lid in the related art, the top of the pot lid arches up and is deformed by pressure in the pot, while the edge of the pot lid is inclined and deformed downward along a pressure-bearing step, and hence, the deformed pot lid affects the fastening effect of the pot lid. The limiting boss 220 is provided at the upper surface of the pot body 200, which can reduce the influence of the deformation of the pot lid 100 on the fastening effect of the pot lid 100, and improve the reliability and stability of the cooking appliance 1.

Optionally, a positioning boss 110 is provided at a lower surface of the pot lid 100, and a positioning groove 210 is provided at the upper surface of the pot body 200. The positioning boss 110 is fitted in the positioning groove 210 when the pot lid 100 is closed. In this way, the positioning boss 110 and the positioning groove 210 can be used to position and orient the pot lid 100 during the closure of the pot lid 100. On the one hand, the positioning boss 110 and the positioning groove 210 can realize the automatic positioning of the axes of the pot lid 100 and the pot body 200 to ensure that the pot lid 100 is accurately fastened on the pot body 200 when closed, thereby improving the working reliability of the cooking appliance 1 and upgrading the cooking effect of the cooking appliance 1. On the other hand, the user can accurately close the pot lid 100 on the first try during the operation, and avoid repeated adjustment of the pot lid 100 when the user closes the pot lid 100, thereby realizing the smooth closure of the pot lid 100, simplifying the operation process, facilitating the user's operation, and improving the operational comfort, compared with the cooking appliances in the related art.

Figure 8:
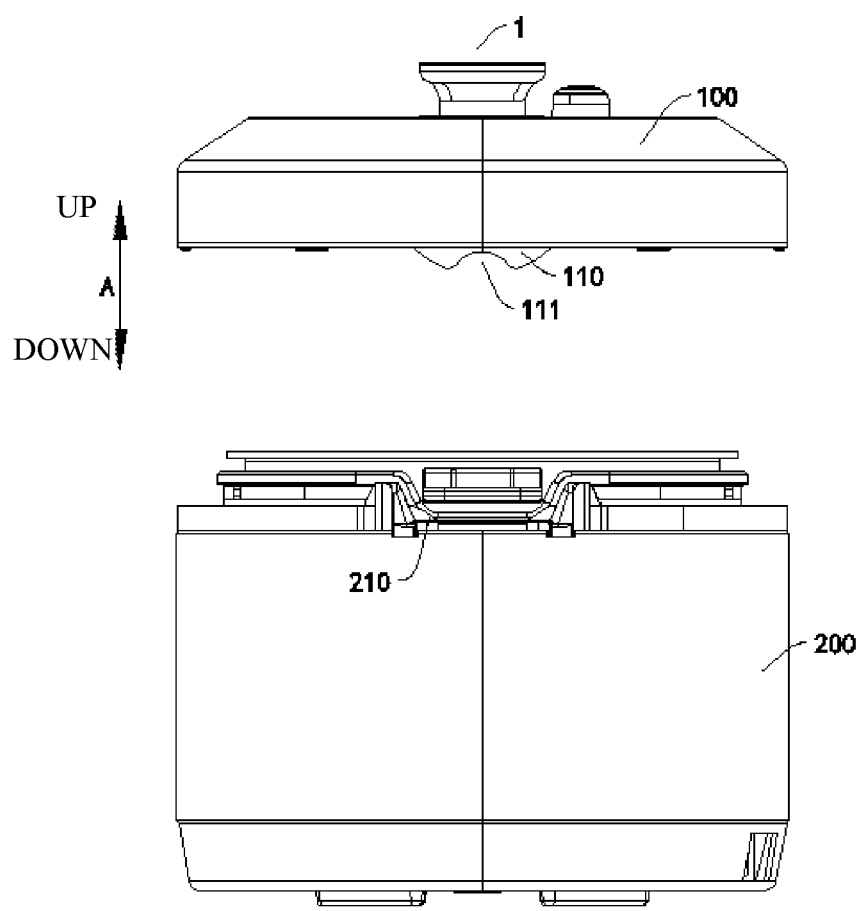
FIG. 8 illustrates an exploded view of a cooking appliance according to an embodiment of the present disclosure.
Figure 9:
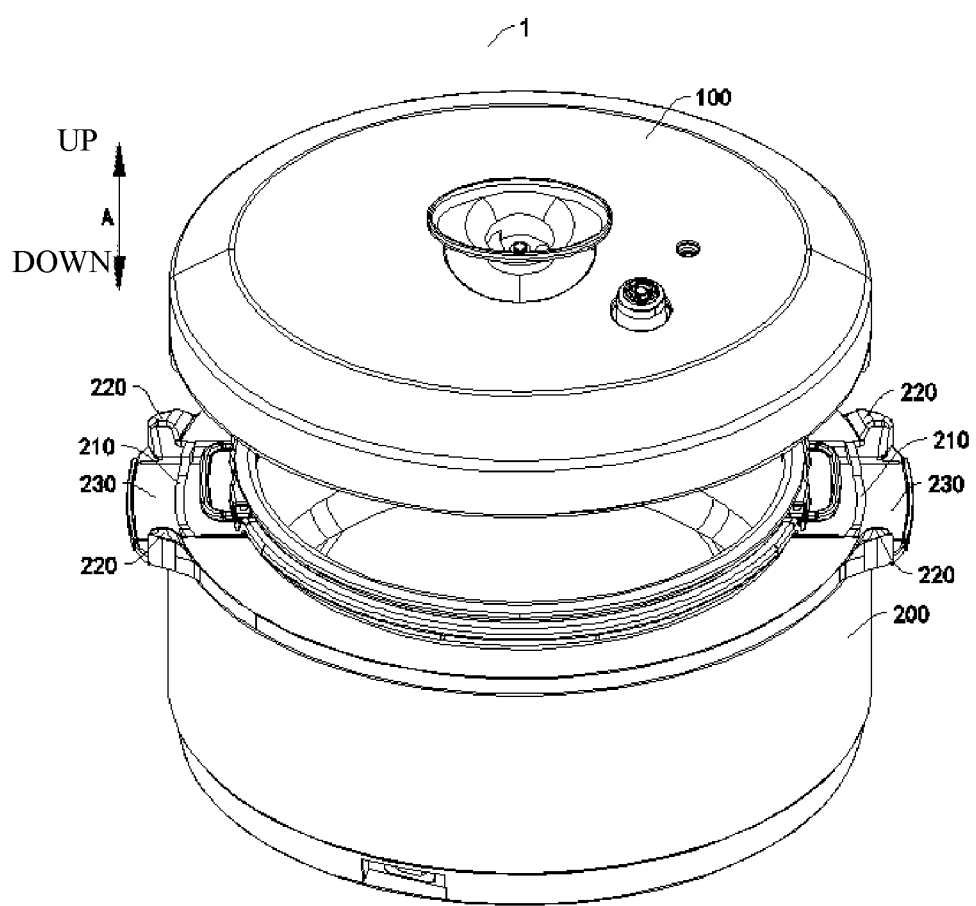
FIG. 9 illustrates an exploded view of a cooking appliance according to an embodiment of the present disclosure.
Figure 11:
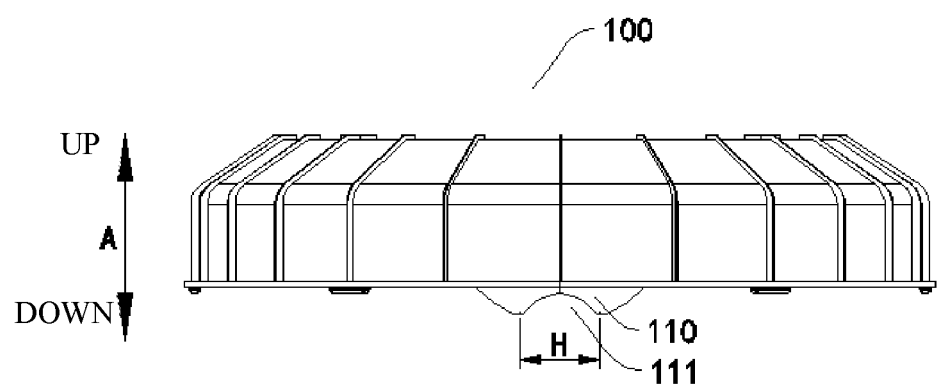
FIG. 11 illustrates a schematic structural view of a pot lid of a cooking appliance according to an embodiment of the present disclosure.
Figure 12:
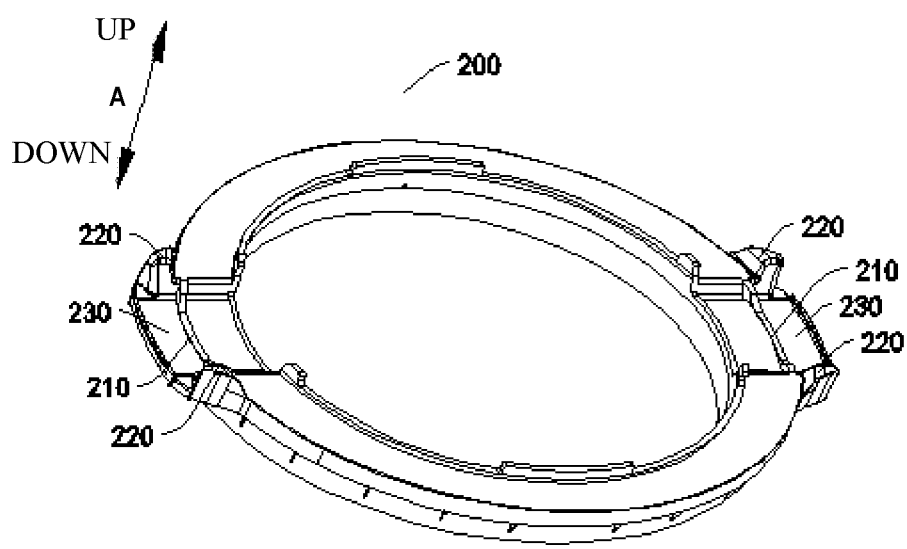
FIG. 12 illustrates a schematic structural view of a pot body of a cooking appliance according to an embodiment of the present disclosure.
Figure 13:
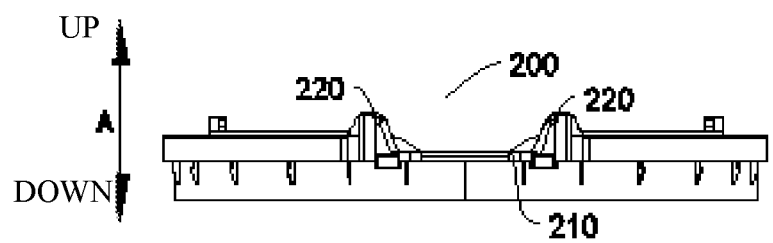
FIG. 13 illustrates a schematic structural view of a pot body of a cooking appliance according to an embodiment of the present disclosure.

Specifically, as shown in FIGS. 8 and 11, the positioning boss 110 has a cross-sectional area increased gradually from bottom to top. As a result, when the pot lid 100 is fastened, the positioning boss 110 slides into the positioning groove 210 automatically through cooperation between an outer surface of the positioning boss 110 and the positioning groove 210, so that the positioning boss 110 can be used to guide the fastening of the pot lid 100 to enable the pot lid 100 to be fastened smoothly.

More specifically, the positioning groove 210 is configured as an arc groove, a V-shaped groove, or a conical groove, and the shape of the positioning boss 110 matches the shape of the positioning groove 210. As a result, the positioning boss 110 and the positioning groove 210 can be used to position and guide the closure of the pot lid 100, which can not only make the closure of the pot lid 100 smoother, but also facilitate the accurate and reliable closure of the pot lid 100.

Figure 10:
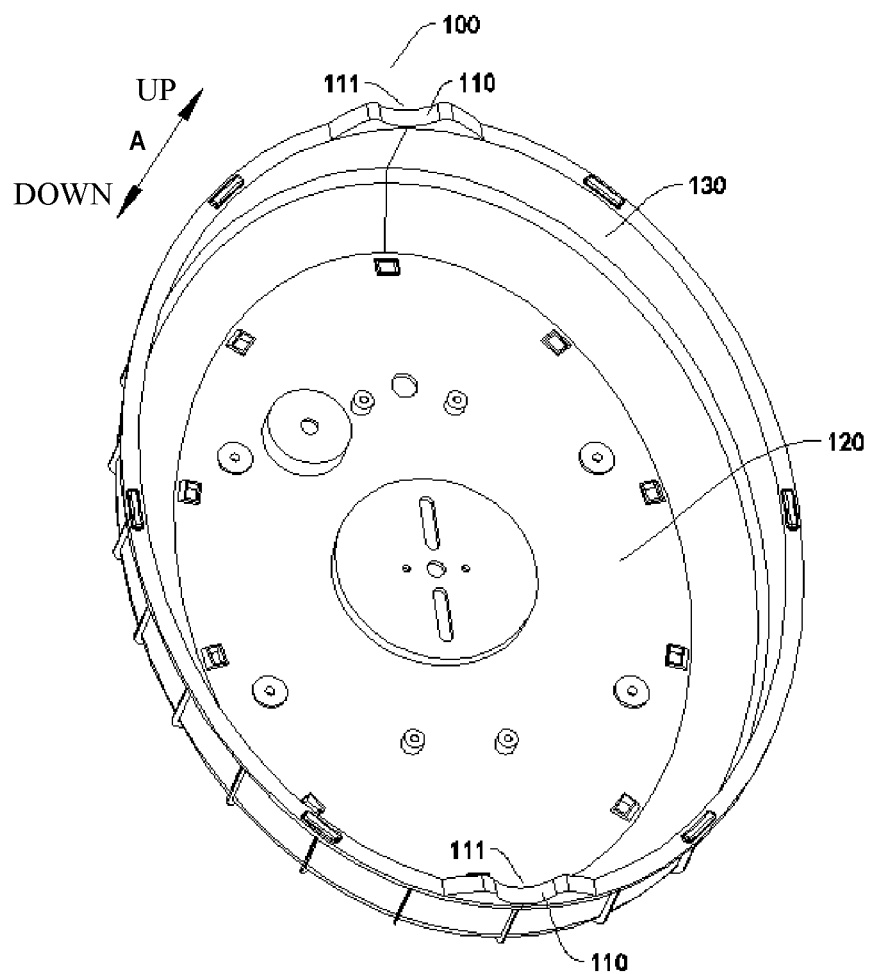
FIG. 10 illustrates a schematic structural view of a pot lid of a cooking appliance according to an embodiment of the present disclosure.

Optionally, as shown in FIG. 10, the pot lid 100 includes a pot lid cover plate 120 and a pot lid enclosure plate 130 connected to the pot lid cover plate 120 and extending in a circumferential direction of the pot lid cover plate 120. The positioning boss 110 is disposed on a lower edge of the pot lid enclosure plate 130. In this way, the arrangement of the positioning boss 110 can be facilitated, and the positioning boss 110 can be fitted in the positioning groove 210 conveniently.

Specifically, as shown in FIG. 10, two positioning bosses 110 are provided and arranged oppositely in the circumferential direction of the pot lid 100. In this way, the pot body 200 and the pot lid 100 can be stressed uniformly, the stability when the pot lid 100 is closed can be enhanced, and the user can fasten the pot lid 100 from different directions.

More specifically, as shown in FIG. 10, each positioning boss 110 is provided with a notch 111 at a lower end thereof, and two ends of each notch 111 form two fulcrums on the positioning boss 110; four fulcrums are on the same plane. Thus, the placement of the pot lid 100 can become convenient, and the pot lid 100 can be placed on a plane after being removed from the pot body 200.

Further, as shown in FIG. 11, a distance H between two fulcrums on each positioning boss 110 is greater than 30 mm, which improves the stability of the pot lid 100 when placed on the plane.

Optionally, the pot lid locking assembly includes a guide rail, and the guide rail is disposed on the pot lid 100. Two snaps are oppositely provided in the circumferential direction of the pot lid 100, and the two snaps can be arranged on the guide rail close to each other or away from each other. When the pot lid 100 is closed, each positioning boss 110 is located between the two snaps in the circumferential direction of the pot lid 100. In this way, the limiting boss 220 is arranged between the two snaps in the circumferential direction of the pot body 200. When the pot lid 100 is closed, the limiting boss 220 can limit and orient the pot lid 100 reliably, which facilitates the fastening of the pot lid 100 and improves the accuracy of the fastening of the pot lid 100, compared with the related art where snaps are used for limitation and orientation but the snaps cannot effectively limit the pot lid in the movement direction of the snaps.

Specifically, the guide rail is oriented along the direction of the short axis, and when the pot lid 100 is closed, two positioning bosses 110 are located at two ends of the long axis respectively.

In this way, it is convenient to improve the structural strength of the pot lid locking assembly and the stability of the pot lid locking assembly, and moreover, since deformation is less likely to occur in the direction of the short axis of the pot lid 100 than in the direction of the long axis thereof, it is possible to prevent the deformation of the pot lid 100 from affecting the sliding of the snaps.

Other configurations and operations of the cooking appliance 1 according to the embodiments of the present disclosure are known to those skilled in the art, and will not be described in detail here.

In the specification, it is to be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial," and "circumferential" should be construed to refer to the orientation as then described or as shown in the drawings under discussion. These relative terms are for convenience and simplicity of description, and do not indicate or imply that the device or element referred to must have a particular orientation, or be constructed and operated in a particular orientation. Thus, these terms should not be constructed to limit the present disclosure. In addition, the features defined with "first," and "second" may comprise one or more of this feature. In the description of the present disclosure, the term "a plurality of" means two or more than two, unless specified otherwise.

In the present disclosure, unless specified or limited otherwise, the terms "mounted," "connected," "coupled," and the like are used broadly, and may be, for example, fixed connections, detachable connections, or integral connections; may also be mechanical or electrical connections; may also be direct connections or indirect connections via intervening structures; may also be inner communications of two elements, which could be understood by those skilled in the art according to specific situations.

Reference throughout this specification to "an embodiment," "some embodiments," "an exemplary embodiment", "an example," "a specific example," or "some examples," means that a particular feature, structure, material, or characteristic described in connection with the embodiment or example is included in at least one embodiment or example of the present disclosure. Thus, the above terms throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been shown and described, it would be appreciated by those skilled in the art that various changes, modifications, alternatives and variations can be made in the embodiments without departing from principles and purposes of the present disclosure. The scope of the present invention is defined by the claims and their equivalents.

What is claimed is:

1. A cooking appliance comprising:
   a pot lid having an oval cross section with a long axis and a short axis orthogonal to each other;
   a pot body including:
      two handles opposite to each other in a circumferential direction of the pot body; and
      a plurality of limiting bosses provided at an upper surface of the pot body and disposed on the two handles, the limiting bosses being configured to abut against an outer peripheral edge of the pot lid when the pot lid is closed;
      wherein each of the two handles is provided with two limiting bosses of the plurality of limiting bosses, the two limiting bosses being spaced apart from each other along the circumferential direction of the pot body; and
   a pot lid locking assembly configured to lock the pot lid in a closed state, the pot lid locking assembly including at least one of a lid locking part disposed at the pot lid or a pot locking part disposed at the pot body.

2. The cooking appliance according to claim 1, wherein an inner side surface of each of the limiting bosses is inclined upward from inside to outside.

3. The cooking appliance according to claim 1, wherein a height of the limiting bosses from the upper surface of the pot body in a vertical direction is 1-25 mm.

4. The cooking appliance according to claim 1, wherein each of the two handles includes a limiting groove at an upper surface of the handle and located between the two limiting bosses of the handle.

5. The cooking appliance according to claim 1, wherein:
   the lid locking part of the pot lid locking assembly includes:
      a guide rail provided at the pot lid; and
      two snaps provided oppositely in a circumferential direction of the pot lid, and disposed on the guide rail and configured to move close to or away from each other; and each handle is located between the two snaps in the circumferential direction of the pot body when the pot lid is closed.

6. The cooking appliance according to claim 5, wherein:
the guide rail is oriented along a direction of the short axis; and
when the pot lid is closed, the two handles are disposed adjacent to two ends of the long axis, respectively.

7. The cooking appliance according to claim 1, wherein the port body further includes:
an outer housing, the limiting boss being provided at an upper surface of the outer housing;
an outer pot configured to be provided in the outer housing; and
an inner pot configured to be provided in the outer pot.

8. The cooking appliance according to claim 7, wherein the inner pot each have an oval cross section.

9. The cooking appliance according to claim 7, wherein:
the inner port includes an inner handle; and
at least a portion of the outer housing protruding outward to form an outer handle, an upper surface of the outer handle including a groove configured to accommodate the inner handle.

10. The cooking appliance according to claim 1, wherein:
the pot lid includes a positioning boss at a lower surface of the pot lid;
the pot body further includes a positioning groove at the upper surface of the pot body; and
the positioning boss is fitted in the positioning groove when the pot lid is closed.

11. The cooking appliance according to claim 10, wherein the positioning boss has a cross-sectional area increasing gradually from bottom to top.

12. The cooking appliance according to claim 11, wherein the positioning groove is configured as an arc groove, a V-shaped groove, or a conical groove, and a shape of the positioning boss matches a shape of the positioning groove.

13. The cooking appliance according to claim 10, wherein:
the pot lid includes:
a pot lid cover plate; and
a pot lid enclosure plate connected to the pot lid cover plate and extending in a circumferential direction of the pot lid cover plate; and
the positioning boss is disposed at a lower edge of the pot lid enclosure plate.

14. The cooking appliance according to claim 10, wherein the positioning boss is one of two positioning bosses of the pot lid that are arranged oppositely in a circumferential direction of the pot lid.

15. The cooking appliance according to claim 14, wherein:
each of the two positioning bosses includes a notch at a lower end of the positioning boss, and two ends of the notch form two fulcrums on the positioning boss; and
the four fulcrums on the two positioning bosses are on a same plane.

16. The cooking appliance according to claim 15, wherein a distance H between the two fulcrums on each of the two positioning bosses is greater than 30 mm.

17. The cooking appliance according to claim 14, wherein:
the lid locking part of the pot lid locking assembly includes:
a guide rail provided at the pot lid and oriented along a direction of the short axis; and
two snaps provided oppositely in a circumferential direction of the pot lid, and disposed on the guide rail and configured to move close to or away from each other; and
when the pot lid is closed:
each positioning boss is located between the two snaps in the circumferential direction of the pot body; and
the two positioning bosses are located at two ends of the long axis, respectively.

18. A cooking appliance comprising:
a pot lid having an oval cross section with a long axis and a short axis orthogonal to each other;
a pot body including:
two handles opposite to each other in a circumferential direction of the pot body and configured to be located at two ends of the long axis of the pot lid when the pot lid is in a closed state; and
a plurality of limiting bosses provided at an upper surface of the pot body and disposed on the two handles, the limiting bosses being configured to abut against an outer peripheral edge of the pot lid when the pot lid is closed;
wherein each of the two handles is provided with two inner side surfaces of the plurality of limiting bosses, the two inner side surfaces being spaced apart from each other along a circumferential direction of the pot lid when the pot lid is in the closed state; and
a pot lid locking assembly configured to lock the pot lid in the closed state, the pot lid locking assembly being disposed on at least one of the pot lid or the pot body.

19. The cooking appliance according to claim 18, wherein:
each of the inner side surfaces is inclined upward from inside to outside; and
a lower end of each of the inner side surfaces has a curvature that matches a lower end of an outer edge of the pot lid.

20. The cooking appliance according to claim 18, wherein:
the long axis and the short axis of the oval cross section of the pot lid intersect each other to form an orthogonal intersection point; and
when the pot lid is in the closed state, each of the inner side surfaces faces the orthogonal intersection point, and is closer to the long axis of the pot lid than to the short axis of the pot lid.

\* \* \* \* \*